(12) United States Patent
Grigorian et al.

(10) Patent No.: US 7,972,697 B2
(45) Date of Patent: Jul. 5, 2011

(54) ELECTROCHEMICAL ACTIVATION OF CAPACITOR MATERIAL

(75) Inventors: Leonid Grigorian, Columbus, OH (US); Toshio Tokune, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1014 days.

(21) Appl. No.: 11/042,344

(22) Filed: Jan. 26, 2005

(65) Prior Publication Data

US 2006/0166090 A1   Jul. 27, 2006

(51) Int. Cl.
    *B32B 9/00* (2006.01)
(52) U.S. Cl. ........................ 428/408; 977/742
(58) Field of Classification Search .................. 428/408; 977/742; 423/447.1
    See application file for complete search history.

(56) References Cited

U.S. PATENT DOCUMENTS

| | | | |
|---|---|---|---|
| 5,498,951 | A | 3/1996 | Okamura et al. |
| 6,064,562 | A | 5/2000 | Okamura |
| 6,191,935 | B1 | 2/2001 | Okamura et al. |
| 6,205,016 | B1 | 3/2001 | Niu |
| 6,310,762 | B1 | 10/2001 | Okamura et al. |
| 6,447,555 | B1 | 9/2002 | Okamura et al. |
| 6,487,066 | B1 | 11/2002 | Niiori et al. |
| 6,555,945 | B1 * | 4/2003 | Baughman et al. ........... 310/300 |
| 6,738,252 | B2 | 5/2004 | Okamura et al. |
| 2003/0077515 | A1 | 4/2003 | Chen et al. |
| 2003/0143453 | A1 | 7/2003 | Ren et al. |

FOREIGN PATENT DOCUMENTS

FR   2 867 600   9/2005

OTHER PUBLICATIONS

Elsevier, Elelctrochemistry Communications 7 (2005) 249-255 Jiang-Shan Ye (available online Jan. 21, 2005).*
Okamura, Michio; Nakamura, Hitoshi; and Ota, Hidetoshi; Production Status of Nanogate Capacitors and Integrated Electronics—Part 2; The 14th International Seminar on Double Layer Capacitors and Hybrid Energy Storage Devices; Dec. 6-8, 2004; pp. 134-141; Deerfield Beach, Florida.

* cited by examiner

*Primary Examiner* — David R Sample
*Assistant Examiner* — Daniel Miller
(74) *Attorney, Agent, or Firm* — Capitol City TechLaw, PLLC; Mark E. Duell

(57) ABSTRACT

The present teachings are directed toward methods for preparing activated capacitor materials by exposing capacitor material to an electrical potential of sufficient voltage and for a sufficient time to activate the capacitor materials. Compositions of capacitor materials containing carbon nanotubes and other carbon-containing materials are also disclosed.

10 Claims, 1 Drawing Sheet

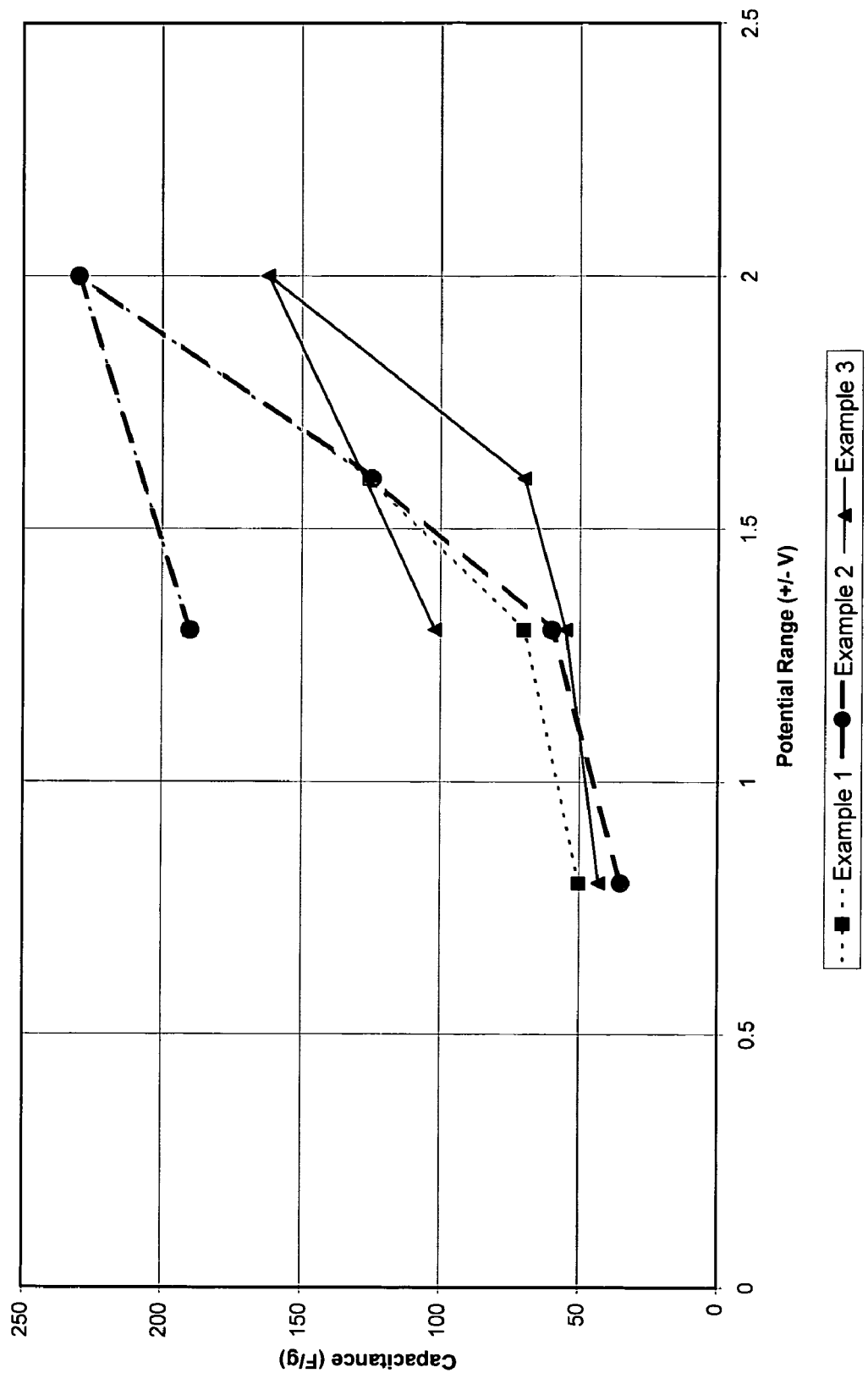

200 # ELECTROCHEMICAL ACTIVATION OF CAPACITOR MATERIAL

BACKGROUND

1. Field of the Invention

This invention relates to a method of electrochemically activating capacitor material to increase the capacitance of the capacitor material.

2. Discussion of the Related Art

Capacitors prepared from carbon nanotube-containing materials can exhibit high levels of performance. However, for super-capacitor applications even higher levels of capacitance performance are desirable or required.

A need exists, therefore, for materials exhibiting high levels of capacitance, and methods of treating materials to achieve high levels of capacitance.

SUMMARY

The present teachings meet the needs for methods to activate capacitor materials and for capacitor materials exhibiting higher capacitance levels.

The present teachings include a method for treating capacitor material involving exposing the capacitor material to an electrical potential for a time sufficient to produce an activated capacitor material.

The present teachings also include a method of treating capacitor material by contacting the capacitor material with an electrochemically conductive medium, and exposing the capacitor material to an electrical potential.

The present teachings additionally include a composition composed of activated capacitor material. The activated capacitor material has been produced by exposing capacitor material to a potential of a sufficient voltage and for a duration of sufficient time to activate the capacitor material.

BRIEF DESCRIPTION OF THE DRAWINGS

The accompanying drawing, which is included to provide a further understanding of the present teachings and is incorporated in and constitute a part of this specification, illustrate various embodiments of the present teachings and together with the detailed description serve to explain the principles of the present teachings. In the drawing:

FIG. 1 is a plot of potential range versus capacitance illustrating the effect of electrochemical activation on three samples of capacitor materials.

DETAILED DESCRIPTION

The present teachings relate to activated capacitor materials and methods of activating the capacitor material. Activation of capacitor materials refers to methods of treating materials to increase or enhance the capacitor material's inherent capacitance. Activation can be measured by comparing the initial capacitance measured to the capacitance measured after the capacitor material has undergone an activation treatment.

According to various embodiments of the present teachings, the activation of the capacitor material appears to be an irreversible process that does not undergo significant deterioration over time. The activation appears to be a stable change in the capacitor material for at least several months. The various embodiments of the present method can produce activated capacitor materials with capacitance over about 150 F/g. According to various embodiments of the present teachings, the capacitor material can have its capacitance increased by a factor ranging from about 2 to about 30. This enhanced capacitance renders the activated capacitor materials suitable for a multitude of electrical and engineering applications, and for which the inactivated capacitor materials would not have been suitable.

According to various embodiments of the present teachings, a method for treating capacitor material is provided by exposing capacitor material to an electrical potential for a time sufficient to produce an activated capacitor material.

According to various embodiments of the present teachings, a treatment method can involve contacting the capacitor material with an electrochemically conductive medium, and exposing the capacitor material to an electrical potential sufficient to produce an activated capacitor material.

According to various embodiments of the present teachings, the electrochemically conductive medium can include, for example, water, aqueous salt solutions, propylene carbonate, ethylene carbonate, sulfolane, and acetonitrile. According to various embodiments of the present teachings, the electrochemically conductive medium can also contain electrolytes, for example, triethylmethylammonium tetrafluoroborate, triethylmethylammonium hexafluorophosphate, tetraethylammonium tetrafluoroborate, tetraethylammonium hexafluorophosphate, tetrabutylammonium tetrafluoroborate, and tetrabutylammonium hexafluorophosphate. Electrically conductive media that can sustain voltages of greater than 1.25 V can be utilized for some of the various embodiments of the present teachings.

According to various embodiments of the present teachings, the method can include having the potential cycle between positive and negative voltages with respect to a reference electrode. The potential can cycle, for example, between about positive 1.25 V and about negative 1.25 V, or between about positive 1.5 V and about negative 1.5 V. According to various embodiments of the present teachings, the potential can be in generated in a wide variety of waveforms. The potential can cycle on a regular or an irregular basis with respect to both potential and time.

According to various embodiments of the present teachings, the method can utilize an electrical potential which is negative with respect to a reference electrode, or an electrical potential which is positive with respect to a reference electrode.

According to various embodiments of the present teachings, the method can utilize a potential which can be sufficient to activate the capacitor material.

According to various embodiments of the present teachings, the method can have the capacitor material exposed to the electrical potential for a duration sufficient to activate the capacitor material. According to various embodiments of the present teachings, the duration of exposure sufficient to activate the capacitor material can be at least about 10 seconds, or for at least about 30 seconds, or for at least about 1 minute. According to various embodiments of the present teachings, the capacitor material can be exposed to the potential for greater durations. One of skill in the art will recognize that innumerable combinations of the magnitude of potential and the length of time of exposure to the potential can be sufficient to activate the capacitor material. Such combinations of potential and time can also vary according to the properties and characteristics of the inactivated capacitor material.

According to various embodiments of the present teachings, the capacitor material can include at least one element selected from the group consisting of carbon-containing material and carbon nanotube-containing material. According to various embodiments of the present teachings, the capacitor material comprises carbon nanotube-containing material.

According to various embodiments of the present teachings, a composition including activated capacitor material is provided. The activated capacitor material can be produced by exposing capacitor material to a potential of a sufficient voltage and for a duration of sufficient time to activate the capacitor material.

According to various embodiments of the present teachings, the composition can be exposed to an electrical potential that cycles between positive and negative with respect to a reference electrode. According to various embodiments of the present teachings, the potential can cycle between about positive 1.25 V and about negative 1.25 V, or can cycle between about positive 1.5 V and about negative 1.5 V.

According to various embodiments of the present teachings, the composition can be exposed to a potential that is positive with respect to a reference electrode. According to various embodiments of the present teachings, the composition can be exposed to a potential that is negative with respect to a reference electrode.

According to various embodiments of the present teachings, the capacitor material can be exposed to the potential for at least about 10 seconds, or for at least about 30 seconds, or for at least about 1 minute. According to various embodiments of the present teachings, the capacitor material can be exposed to the potential for greater durations. One of skill in the art will recognize that the composition can be exposed to innumerable combinations of the magnitude of potential and the length of time of exposure to the potential sufficient to activate the capacitor material.

According to various embodiments of the present teachings, the composition can be composed of capacitor material that includes at least one element selected from the group consisting of carbon-containing material and carbon nanotube-containing material. According to various embodiments of the present teachings, the composition comprises carbon nanotube-containing material.

As used herein, a reference electrode refers to a silver/silver chloride electrode as known to those in the art.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXAMPLES

Example 1

A sample of HiPCO carbon nanotubes (obtained from Carbon Nanotechnologies, Inc. of Houston, Tex.) was treated under a pure argon gas flow of 200 sccm at 800° C. for one hour. After the argon treatment, a 90 mg sample of the HiPCO carbon nanotubes was mixed with 10 mg polytetrafluoroethene (PTFE) and formed into a pellet measuring approximately 20 mm diameter by approximately 50 to 100 microns thick.

A portion of the pellet was then pressed onto the tip of an aluminum electrode and placed into an propylene carbonate bath containing tetrafluoroborate of triethylmethylammonium as the working electrode. The bath also contained a platinum counter electrode and a silver/silver chloride reference electrode.

The pellet was then exposed to a potential cycling between ±0.8 V at a scan rate of 10 mV/sec. The capacitance measured at 0 V was 50 F/g.

The pellet was next exposed to a potential cycling between ±1.3 V at a scan rate of 10 mV/sec. The capacitance measured at 0 V was 70 F/g.

The pellet was then exposed to a potential cycling between ±1.6 V at a scan rate of 10 mV/sec. The capacitance measured at 0 V was 126 F/g.

The pellet was then exposed to a potential cycling between ±2.0 V at a scan rate of 10 mV/sec. The capacitance measured at 0 V was 230 F/g.

Finally, the pellet was re-exposed to a potential cycling between ±1.3 V at a scan rate of 10 mV/sec. The capacitance measured at 0 V was 190 F/g, reflecting an increase in capacitance by a factor of 2.7. The results are presented in FIG. 1.

Example 2

A second sample was prepared and evaluated as set forth in Example 1 above. The results are tabulated below, and graphed in FIG. 1. The capacitance measured at ±1.3 V after the exposure to higher potential increased by a factor of 3.2.

| Potential Range (V) | Capacitance at 0 V (F/g) |
| --- | --- |
| ±0.8 | 35 |
| ±1.3 | 60 |
| ±1.6 | 125 |
| ±2.0 | 230 |
| ±1.3 | 190 |

Example 3

A sample of HiPCO carbon nanotubes (obtained from Carbon Nanotechnologies, Inc. of Houston, Tex.) was treated under a dry air flow of 200 sccm at 350° C. for one hour. After the dry air treatment, a 90 mg sample of the HiPCO carbon nanotubes was mixed with 10 mg polytetrafluoroethene (PTFE) and formed into a pellet measuring approximately 20 mm diameter by approximately 50 to 100 microns thick.

A portion of the pellet was then pressed onto the tip of an aluminum electrode and placed into a propylene carbonate bath containing tetrafluoroborate of triethylmethylammonium as the working electrode. The bath also contained a platinum counter electrode and a silver/silver chloride reference electrode.

The pellet was then exposed to a potential cycling between ±0.8 V at a scan rate of 10 mV/sec. The capacitance measured at 0 V was 43 F/g.

The pellet was next exposed to a potential cycling between ±1.3 V at a scan rate of 10 mV/sec. The capacitance measured at 0 V was 55 F/g.

The pellet was then exposed to a potential cycling between ±1.6 V at a scan rate of 10 mV/sec. The capacitance measured at 0 V was 70 F/g.

The pellet was then exposed to a potential cycling between ±2.0 V at a scan rate of 10 mV/sec. The capacitance measured at 0 V was 162 F/g.

Finally, the pellet was re-exposed to a potential cycling between ±1.3 V at a scan rate of 10 mV/sec. The capacitance measured at 0 V was 102 F/g, reflecting an increase in capacitance by a factor of 1.9. The results are presented in FIG. 1.

Example 4

A 90 mg sample of SWNT carbon nanotubes prepared by an electric arc method (supplied by Carbon Solutions, Inc. of Riverside, Calif.) was mixed with 10 mg poly(3,4-ethylenedioxythiopene) ("PEDOT") and formed into a pellet measuring approximately 20 mm diameter by approximately 50 to 100 microns thick.

A portion of the pellet was then pressed onto the tip of an aluminum electrode and placed into a propylene carbonate bath containing tetrafluoroborate of triethylmethylammonium as the working electrode. The bath also contained a platinum counter electrode and a silver/silver chloride reference electrode.

The capacitance of the pellet was then measured by cyclic voltammetry at a constant scan rate of 10 mV/sec. This initial capacitance measurement was 5 F/g at 0 V.

The pellet was then exposed to a potential cycling between ±1.4 V, with respect to the silver/silver chloride electrode, at a scan rate of 10 mV/sec. The capacitance of the pellet was then remeasured by cyclic voltammetry at a constant scan rate of 10 mV/sec. The second capacitance measurement was 140 F/g at 0 V, this second capacitance measurement reflects an increase in capacitance by a factor of 28.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method for treating capacitor material comprising:
   contacting single-walled carbon nanotube-containing capacitor material with a non-aqueous organic electrolyte;
   exposing the single-walled carbon nanotube-containing capacitor material to a first electrical potential cycling between about +1.0 V and about −1.0 V; and then
   exposing the single-walled carbon nanotube-containing capacitor material to a second electrical potential cycling between a positive potential greater than about +1.25 V and a negative potential less than about −1.25 V,
   wherein the total time of exposure is for a time sufficient to produce an activated capacitor material, and
   activated capacitor material refers to capacitor material after exposure to the second electrical potential cycling exhibiting an at least two-fold increase in capacitance over the capacitance of the capacitor material after exposure to the first electrical potential cycling.

2. The method according to claim 1, wherein the second electrical potential cycles between about positive 1.5 V and about negative 1.5 V.

3. The method according to claim 1, wherein the non-aqueous organic electrolyte comprises at least one member selected from the group consisting of propylene carbonate, ethylene carbonate, sulfolane, and acetonitrile.

4. The method according to claim 1, further comprising
   exposing the single-walled carbon nanotube-containing capacitor material to a third electrical potential cycling between a positive potential greater than about +1.25 V and a negative potential less than about −1.25 V.

5. A composition comprising:
   activated single-walled carbon nanotube-containing capacitor material,
   wherein the activated capacitor material has been produced by first exposing capacitor material to a first electrical potential cycling between about +1.0 V and about −1.0 V; and then to a second electrical potential cycling between a positive potential greater than about +1.25 V and a negative potential less than about −1.25 V,
   wherein the total time of exposure is for a time sufficient to produce an activated capacitor material, and
   wherein activated capacitor material refers to capacitor material after exposure to the second electrical potential cycling exhibiting an at least two-fold increase in capacitance over the capacitance of the capacitor material after exposure to the first electrical potential cycling.

6. The composition according to claim 5, wherein the second electrical potential cycles between about positive 1.5 V and about negative 1.5 V.

7. The composition according to claim 6, wherein the activated capacitor material exhibits a capacitance of at least about 100 F/g after exposure to the second electrical potential cycling.

8. The composition according to claim 5, wherein the exposing of the capacitor material occurs in a non-aqueous organic electrolyte.

9. The composition according to claim 8, wherein the non-aqueous organic electrolyte comprises at least one member selected from the group consisting of propylene carbonate, ethylene carbonate, sulfolane, and acetonitrile.

10. The composition according to claim 5, wherein the activated capacitor material exhibits a capacitance of at least about 100 F/g after exposure to the second electrical potential cycling.

* * * * *